United States Patent
Fan et al.

(10) Patent No.: US 10,067,981 B2
(45) Date of Patent: Sep. 4, 2018

(54) INTELLIGENT MEMORY BLOCK REPLACEMENT

(71) Applicant: SAP SE, Walldorf (DE)

(72) Inventors: Nairu Fan, Shanghai (CN); Tianyu Luwang, Shanghai (CN); Conglun Yao, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 200 days.

(21) Appl. No.: 14/550,872

(22) Filed: Nov. 21, 2014

(65) Prior Publication Data

US 2016/0147461 A1    May 26, 2016

(51) Int. Cl.
| | |
|---|---|
| *G06F 12/12* | (2016.01) |
| *G06F 12/08* | (2016.01) |
| *G06F 17/30* | (2006.01) |

(52) U.S. Cl.
CPC .............................. *G06F 17/3048* (2013.01)

(58) Field of Classification Search
None
See application file for complete search history.

(56) References Cited

U.S. PATENT DOCUMENTS

| | | | | |
|---|---|---|---|---|
| 5,822,759 A | * | 10/1998 | Treynor ................ | G06F 12/127 711/134 |
| 6,266,742 B1 | * | 7/2001 | Challenger .......... | G06F 12/123 711/133 |
| 6,341,281 B1 | * | 1/2002 | MacNicol ........ | G06F 17/30451 |
| 6,370,622 B1 | | 4/2002 | Chiou et al. | |
| 6,931,490 B2 | * | 8/2005 | Wong ................. | G06F 12/0862 711/128 |
| 7,165,147 B2 | | 1/2007 | Ting et al. | |
| 7,194,477 B1 | * | 3/2007 | Bradley ................ | G06Q 30/02 |
| 7,284,096 B2 | | 10/2007 | Schreter | |
| 7,383,389 B1 | | 6/2008 | Bumbulis | |
| 7,552,153 B2 | | 6/2009 | Dostert et al. | |
| 7,921,260 B2 | | 4/2011 | Cain, III et al. | |
| 7,949,839 B2 | | 5/2011 | Stanfill | |
| 8,615,635 B2 | | 12/2013 | Rakic | |
| 8,650,081 B2 | | 2/2014 | Basel et al. | |
| 8,688,915 B2 | | 4/2014 | Daly et al. | |
| 2002/0112123 A1 | | 8/2002 | Becker et al. | |
| 2004/0122845 A1 | * | 6/2004 | Lohman ............ | G06F 17/30445 |
| 2007/0033185 A1 | * | 2/2007 | Maag ....................... | G06N 5/02 |

(Continued)

OTHER PUBLICATIONS

Machine learning and Data Mining—Association Analysis with Python—CARACIOLO (Year: 2013).*

(Continued)

*Primary Examiner* — Tracy Chan
(74) *Attorney, Agent, or Firm* — Klarquist Sparkman, LLP

(57) ABSTRACT

A framework for intelligent memory replacement of loaded data blocks by requested data blocks is provided. For example, various factors are taken into account to optimize the selection of loaded data blocks to be discarded from the memory, in favor of the requested data blocks to be loaded into the memory. In some implementations, correlations between the requested data blocks and the loaded data blocks are used to determine which of the loaded data blocks may become candidates to be discarded from memory.

20 Claims, 6 Drawing Sheets

(56) References Cited

U.S. PATENT DOCUMENTS

| | | | | |
|---|---|---|---|---|
| 2007/0113014 A1* | 5/2007 | Manolov | ............... | G06F 12/121 |
| | | | | 711/133 |
| 2012/0072656 A1* | 3/2012 | Archak | ............. | G06F 17/30132 |
| | | | | 711/104 |
| 2012/0284275 A1* | 11/2012 | Vadrevu | ............ | G06F 17/30713 |
| | | | | 707/738 |
| 2014/0136788 A1* | 5/2014 | Faerber | ............. | G06F 17/30315 |
| | | | | 711/133 |
| 2014/0136792 A1 | 5/2014 | Frachtenberg | | |
| 2015/0308856 A1* | 10/2015 | Srinivasan | ............. | G01D 4/002 |
| | | | | 340/870.02 |

OTHER PUBLICATIONS

Mining association rules between sets of items in large DB_Agrawal (Year: 1993).*
Mining multi-level assoc rules in large DB_Han (Year: 1999).*

* cited by examiner

INTELLIGENT MEMORY BLOCK REPLACEMENT

TECHNICAL FIELD

The present disclosure relates generally to databases and more specifically to replacing or exchanging data in memory.

BACKGROUND

In-memory databases are developed to take full advantage of modern hardware to increase performance. By keeping all relevant data in main memory (e.g., Random Access Memory (RAM)), data processing operations can be significantly accelerated.

More and more enterprises and institutes apply in-memory databases to process and analyze big data. Since all relevant data is kept in memory, an in-memory database is no doubt superior to a traditional database in terms of operation speed. However, keeping all data in memory can also raise a problem when the available memory size (RAM) is less than the total data size of the database. For example, in such a case, less than the entire database is loaded into the memory at a time. Memory replacement techniques are generally used in such situations. For example, a portion of the database that is currently loaded into the memory is exchanged for another portion of the database that is requested, but is not currently loaded into the memory.

Many existing memory replacement algorithms are based on a paging technique, which mainly deals with memory management on an operating system level. The memory and a program's address space are divided into page frames. If the requested pages are not in the main memory, these pages will be swapped into the main memory for execution. However, this technique does not fit for a column-based in-memory database, which doesn't use pages. To improve the data scanning speed for column-based systems, in-memory databases often keep each column in a continuous address space. Consequently, memory swapping/replacement is based on data columns, which are usually much larger than page frames. In such cases, traditional page-based memory replacement techniques often do not work.

SUMMARY

A framework for replacing or exchanging data in memory is described herein. In accordance with one aspect, the framework calculates an amount of loaded data to be discarded from the memory. Candidate loaded data columns to be discarded from the memory may be selected based on correlations of the loaded data columns to requested data columns. The framework may further calculate a score for each candidate loaded data column, discard a quantity of candidate loaded data columns with a greatest score, and load the requested data columns into the memory.

With these and other advantages and features that will become hereinafter apparent, further information may be obtained by reference to the following detailed description and appended claims, and to the figures attached hereto.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
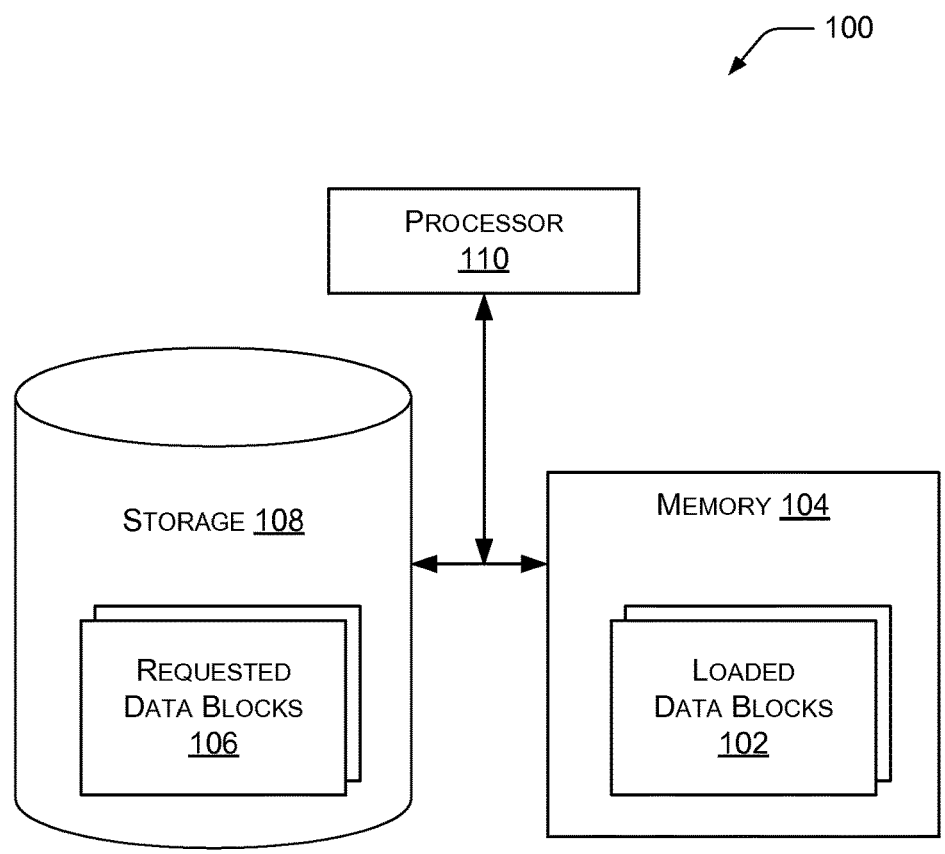
FIG. 1 is a block diagram of an example computing environment, wherein the techniques and devices discussed herein may be implemented.

Various techniques and systems for replacing or exchanging data in memory are disclosed, according to example implementations. For example, referring to FIG. 1, the techniques and systems describe swapping, replacing, exchanging, etc., columns of data 102 currently in memory 104 for requested columns of data 106, which are loaded into memory 104 (e.g., from storage 108) in its place. For ease of discussion, the disclosure describes the various techniques with reference to an illustrated computing environment (system) 100. However, the descriptions are also applicable to other computing environments, networks, other forms and types of computing models, and the like.

Traditional memory replacement algorithms can be either too complex to use or too simple, taking too few factors into account. For example, factors such as the quantity of visits of a data block 102, the memory size of the data block 102, and the correlation between different data blocks 102 could have an important impact on a selection decision, but are often not included. In an example, an improved data replacement module (e.g., arrangement, component, etc.) operative on the system 100 identifies and swaps out a data block (e.g., column of data) 102 whose next use (e.g., request) will be the farthest in the future, when another data block (e.g., column of data) 106 needs to be swapped into the memory 104. Such a technique can be problematic to implement, because of the difficulty in accurately predicting a future request for a data block 102 or a future use of the data block 102.

In an implementation, an optimal memory replacement (e.g., exchange, swap, etc.) arrangement 300 (see FIG. 3) exchanges columns of data 102 within memory 104 using the notion that different sets of data columns 102 are used for different types of queries in a database. For example, within business scenarios, similar types of queries are often executed consecutively. That is, queries on sales data are usually run together, rather than interleaving the queries on sales data with queries on production data. It is assumed that the data that is run together has a greater correlation to each other than to other data blocks.

In the implementation, an association rule algorithm is used to analyze the correlations between the currently loaded columns 102 of a database table. The analysis results predict the columns 102 whose next use will not occur in the nearest future. In other words, based on the relative correlations, the data columns 102 that are to be replaced (or swapped out) have a lower chance of being requested in the near future than other columns 102 currently loaded into the memory 104. In the implementation, multiple factors can be taken into account, such as recent visit time, number of visits, size, and other historical usage data. In an implementation, the memory replacement arrangement 300 adapts to changes in database system behavior. For example, if usage of a column 102 is drastically reduced in a recent period of time, its chances of being swapped out of memory 104 is increased.

For an in-memory database system with a limited amount of memory 104, memory replacement could occur frequently. Accordingly, it is desirable that the computations (performed by the processor 110, for example) for swapping the columns (106 for 102) be quick and/or infrequent, to maintain the efficiency of the system 100. In one implementation, to reduce system 100 overhead, an example memory replacement arrangement 300 executes an association rule algorithm periodically (e.g., once in a week, a few times per month, etc.) when the system 100 workload is low. In most cases, it can be safely assumed that system 100 behavior will not change in a relatively short period of time. In the implementation, the system 100 is arranged to search for candidate columns 102 through the pre-computed results of the association rule algorithm, instead of executing the algorithm again.

Various techniques for replacing data 102 in memory 104 are disclosed. The discussion herein is intended to illustrate components and techniques which may be utilized in optimizing memory block exchange with regard to a column-based database application, but the examples described are not intended to be limiting. In various implementations, fewer, alternate, or additional components may be included to perform various portions of described techniques while remaining within the scope of the disclosure.

FIG. 1 shows an example computing environment (e.g., system) 100 wherein the techniques and devices of a memory replacement arrangement 300, may be implemented. In the example, the system 100 uses a control component, such as the processor 110, for example, to automatically provide memory replacement management to the arrangement 300. In various implementations, the system 100 automatically determines which of the currently loaded data blocks (e.g., columns) 102 loaded in the memory 104 will be exchanged or swapped out for requested data blocks (e.g., columns) 106 stored in storage 108.

In an implementation, the loaded data blocks 102 and the requested data blocks 106 comprise columns of data associated to a relational database application. In the implementation, the data blocks 102, 106 may have any size, and may be of different sizes. Accordingly, it may not be a one-for-one exchange when swapping out a data block 106 for a data block 102. In such an instance, the size of the data block 106 is considered, and enough of data blocks 102 are removed from memory 104 to accommodate the size of the data block 106. In alternate implementations, the data blocks 102, 106 may comprise any groups, sets, arrangements, etc., of data, having any size (e.g., quantity of fields, size of fields, number of bits or bytes, etc.), configuration, and the like.

In an implementation, the memory 104 comprises random access memory (RAM), or the like. In the implementation, the loaded data blocks 102 are loaded into the memory 104 for faster access by the processor 110 while running an application. In other implementations, the memory 104 comprises other fixed or temporary memory storage that has fast access (read/write) by the processor 110 (as compared to other memory storage components or devices of the system 100).

In an implementation, the storage 108 comprises one or more memory storage devices that are typically used for bulk data storage, and have a greater capacity as compared to the memory 104. A non-exhaustive list of storage 108 components includes: hard disk drives, floppy disk drives, optical drives, tape drives, and the like.

In an implementation, the processor 110 performs memory block replacement or exchange via one or more algorithms, which include techniques for determining which of the currently loaded data blocks 102 are to be swapped out for the requested data blocks 106.

In various implementations, the system 100 may be connected to a network. In alternate implementations, the network may include a network such as an Ethernet Local Area Network (LAN), a token ring LAN, or other LAN, a Wide Area Network (WAN), a system area network, or other types of network, and can include several nodes or hosts (not shown). Moreover, the network can also include hardwired, optical, and/or wireless connection paths. In various implementations, the storage 108 may be located remotely, and accessed via the network (e.g., remote server, cloud storage, etc.).

Figure 2:
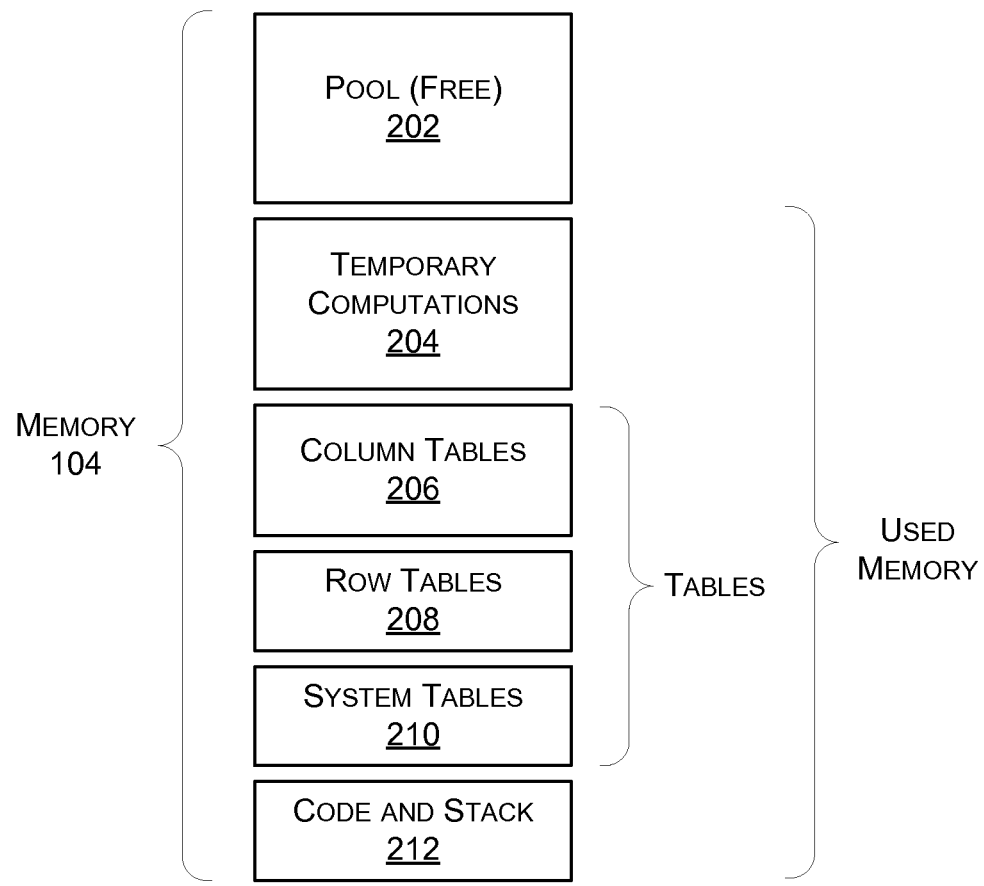
FIG. 2 is a diagram illustrating a model of an example memory for an in-memory database, according to an example.

FIG. 2 is a diagram illustrating a model of an example memory 104. In the illustration, the memory 104 is being used with an in-memory database, according to an example. As shown in FIG. 2, different portions of the database, as well as other system 100 components, may be loaded into the memory 104.

For example, the memory 104 may include free memory 202 and used memory (204, 206, 208, 210, and 212). Within some of the used memory may reside currently loaded data blocks 102, comprising temporary computations 204, column tables 206, row tables 208, system tables 210, and application code and/or memory stack 212. In various implementations, requested data blocks 106 may be loaded into free memory 202, unless there is insufficient free memory 202 for the size of the requested data 106. In such cases, some of the current data 102 loaded into the used memory, such as is loaded into the tables (206, 208, 210) may be removed from memory 104 and saved to storage 108. Then, requested data 106 that is stored in storage 108 may be loaded into memory 104 in the freed-up memory 104 space.

In alternate implementations, the system 100 may be comprised of fewer or additional components, within which differently arranged structures may perform the techniques discussed within the disclosure.

One of the most-used algorithms for memory replacement includes discarding the least recently used (e.g., accessed) data items or blocks 102 first, when making room for requested data blocks 106. However, since the most recent access time of the data blocks 102 is the only factor considered, this technique may cause problems. In an example, consider a structured query language (SQL) request to execute in a database which requests data from two columns A and B of 106, not currently loaded in memory 104. The database also includes series columns C, D, E, F, and G of 102, which are loaded in the memory 104, and there is little or no free memory available.

According to the least recently used algorithm, a quantity of columns 102 are discarded one by one, starting with the column 102 with the oldest visited time. This continues until there is enough free memory to load the requested columns A and B (106).

In the example, it is assumed that columns E and G (102) are selected and will be discarded from memory 104. But if columns A and B (106) have high correlations with columns E and G, there is a high probability that columns E and G (102) will be accessed in the near future. Accordingly, if columns E and G (102) are discarded from memory 104, the efficiency of the system 100 is reduced, since they will need to be re-loaded into the memory 104 in the near future. Thus, additional factors, including correlations between columns can improve efficiency of the system 100, if considered when swapping memory blocks 102.

Figure 3:
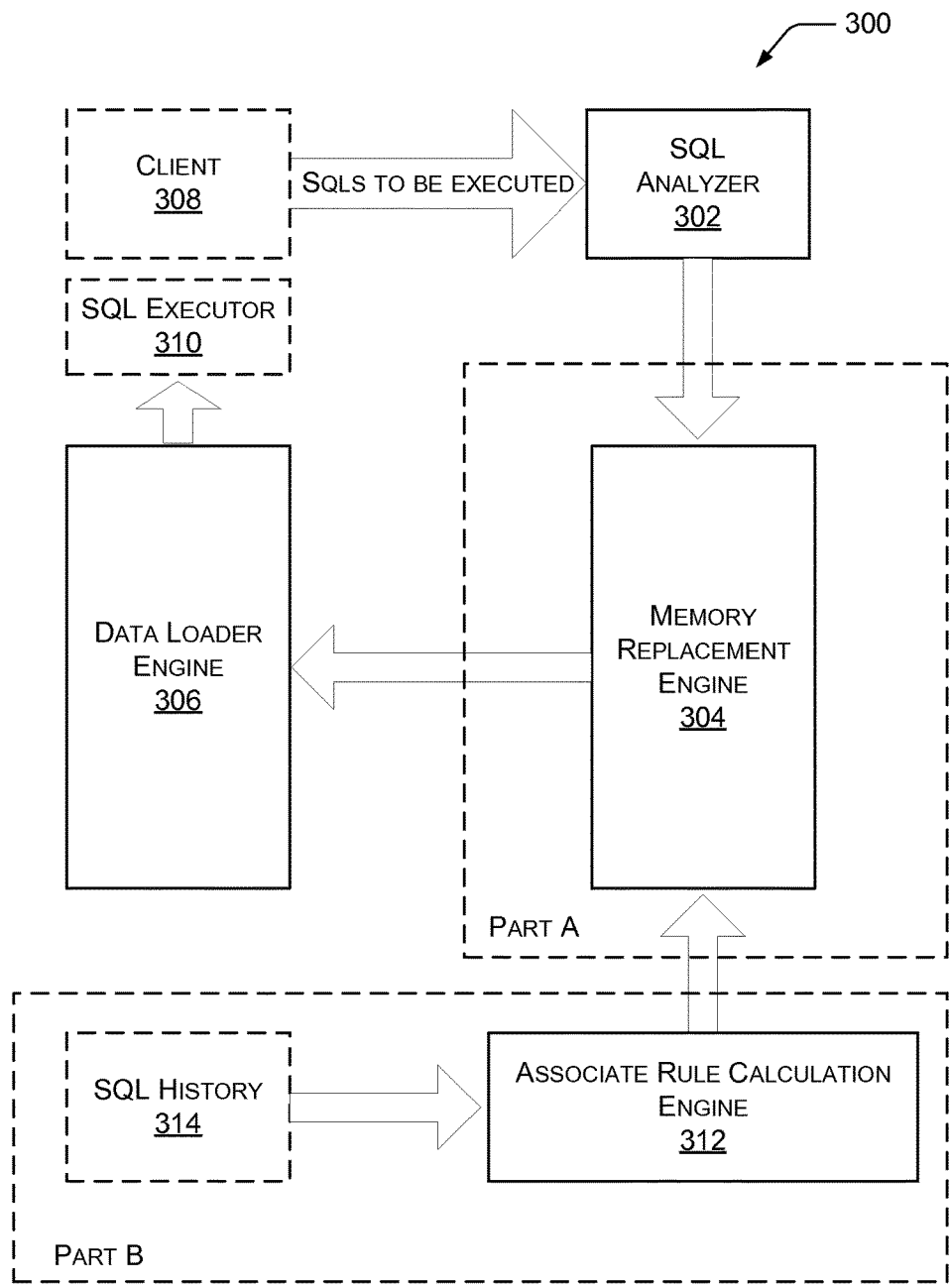
FIG. 3 is a block diagram of an example memory replacement arrangement architecture.

FIG. 3 is a block diagram of an example memory replacement module (e.g., arrangement, component, etc.) ("MRA") 300, including example architecture, according to one implementation. In an implementation, the MRA 300 determines which of the current data blocks (e.g., columns) 102 loaded in memory 104 will be exchanged or swapped out for requested data blocks (e.g., columns) 106 stored in storage 108. In an implementation, one or more factors, including correlations between columns (102, 106), recent column 102 visit (e.g., access) time, number of visits, number of columns 102, and the like, are used by the MRA 300 to determine which columns 102 to replace with requested columns 106 in the memory 104.

In various implementations, the components and modules of the MRA 300 may be embodied in hardware and software components. For example, the components and modules may include hardware components residing in the control or processor 110 and/or may include computer executable instructions stored in memory 104 and operable on the processor 110 to perform the functions described.

As shown in FIG. 3, the MRA 300 may include a "Part A" comprising a memory replacement engine 304. In the implementation, the engine 304 manages the memory block exchange or replacement, according to the directions determined by the components of the MRA 300. In other words, the engine 304 manages the move of some data blocks 102 out of the memory 104 and the move of requested data blocks 106 from storage 108 to the memory 104.

SQL analyzer 302 may load the columns 106 and determine the size of the data blocks 106. In one implementation, SQL analyzer 302 receives information regarding the SQL request, and determines which columns 106 are needed for fulfilling the request. Additionally, based on the columns 106 to be loaded, SQL analyzer 302 detects the amount of memory 104 that will be desired for the requested columns 106. Accordingly, this information is received by the memory replacement engine 304, and used to manage the memory exchange.

Data loader engine 306 may perform the memory moves out of and into the memory 104, based on the management of the memory replacement engine 304. For example, the data loader engine 306 moves the requested columns 106 into memory 104 locations previously occupied by data blocks 102. The move of data 106 into the memory 104 locations may effectively discard previous data blocks 102 from the memory 104.

In various implementations, the client 308 provides the SQL requests to be executed, and the SQL executor 310 executes the SQL requests. In an implementation, executing a SQL request by the SQL executor 310 includes receiving information regarding loaded columns 106 from the data loader engine 306.

Correlations between different columns (102, 106) may be determined by "Part B" of the MRA 300. However, as mentioned above, the correlations between columns (102, 106) do not need to be calculated every time a memory exchange takes place. In various implementations, correlations are calculated during spare time or according to a certain time delay, periodic, or predetermined timing. In an implementation, associate rule calculation engine 312 determines correlations between columns (102, 106) based on request and/or access history data provided by SQL history module 314.

Correlations between columns (102, 106) may be determined between two or more loaded columns 102, two or more requested columns 106, and/or between one or more loaded columns 102 and one or more requested columns 106. In various implementations, correlations are determined by the associate rule calculation engine 312 using one or more algorithms as described herein.

In some implementations, the inputs to the MRA 300 include one or more of the following parameters: the size of data to be loaded in the memory 104, the columns 106 to be loaded, the size of free memory within the memory 104, the executed SQL history, and the like. In one implementation, the inputs to the MRA 300 include all of the above parameters. MRA 300 may generate one or more tables to determine candidate columns 102 to be discarded from memory 104 in favor of requested columns 106. In another implementation, the output of the MRA 300 includes one or more generated tables with candidate columns 102 listed within them.

A table of candidate columns 102 (herein entitled CANDIDATE_COLUMNS) may be generated by an output of an associate rules algorithm (e.g., CORRELATION_TABLE) and a system memory table, for example. The system memory table records the status, size, and other information of columns 102, which can be used to check whether one column 102 is already loaded into memory 104 or not. In an implementation, another algorithm can be used to calculate which combination of candidate columns 102 should be discarded, based on another table (e.g., COMBINATION_COLUMNS_SET), discussed further below. The score of the combination can be calculated based on size, recent visit (e.g., access) time, number of visits and the column 102 number. In one implementation, the combination with highest score will have the highest priority to be discarded from the memory 104. The identifier of the selected column 102 will be outputted to the memory replacement engine 304 for discarding from memory 104.

In an implementation, a data structure (e.g., table, matrix, etc.) "nNode" is constructed for the purpose of calculating correlations between the columns 102. In the implementation, a table "nNode" is designed for each transaction, where $n\text{Node}=(id,col1,col2,col3 \ldots),$ and id is an Identifier of the transaction, and col is the columns 102 used in the transaction.

In an implementation, another data structure "mNode" is constructed for the purpose of calculating the score of selected columns 102. In the implementation, a table "mNode" is designed for each column, where $m\text{Node}=(id,t,\text{visits},\text{size}),$ and id is an Identifier of the memory block, t is an integer number that indicates the recent visit time of the columns 102 (the earlier the visit the smaller the value will be), visits is the quantity of visits of the column 102, and size is the size of the column 102. In an example, the values of the variables id, time, visits and size can all be retrieved from database's memory replacement engine 304.

For the purposes of the following discussion, the following variables are used:
M_NEED_SIZE: Total memory 104 size required.
COLUMN_LIST: The requested column 106 list.
M_FREE_SIZE: The size of free memory 202.

G_SIZE: The size of memory needed to be discarded.
CORRELATION_TABLE: This table records the correlations between columns 102.
MIN_SUPPORT: The minimal threshold of associate rule algorithm's support.
MIN_CONFIDENCE: The minimal threshold of associate rule algorithm's confidence.
MIN_CORRELATIONS: The default correlations.
CANDIDATE_COLUMNS: The candidate columns 102 which all have relatively smaller correlations with the requested columns 106 and are already loaded into memory 104.
COMBINATION_COLUMNS_SET: The columns' combination set which are generated from candidate columns 102 and are used to calculate the objective function to get the best selection strategy.

Figure 4:
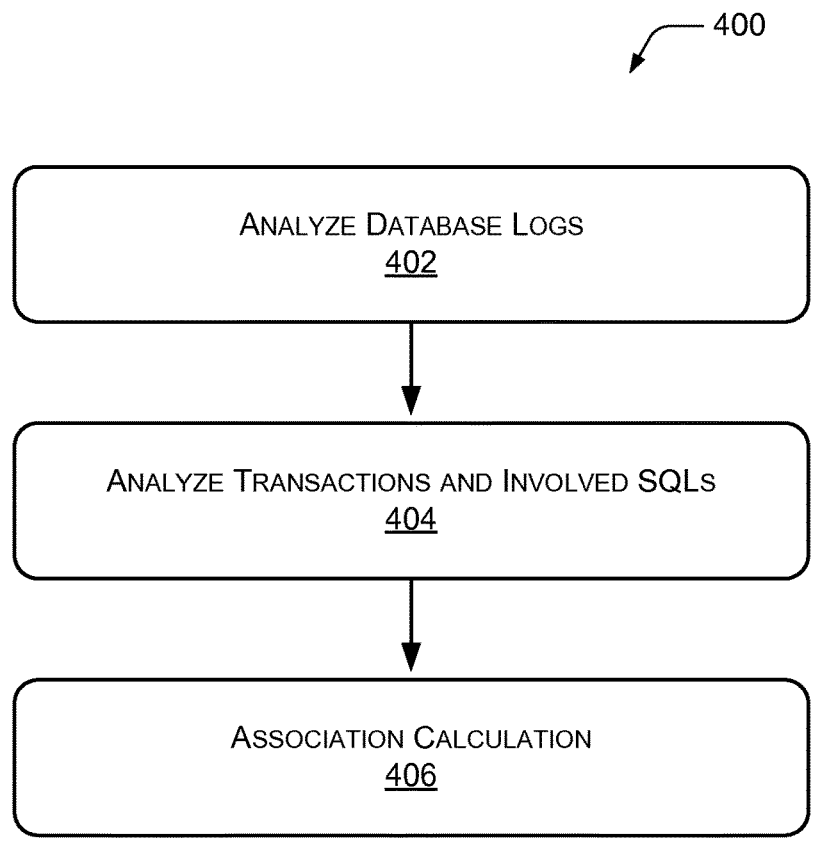
FIG. 4 is a flow diagram illustrating an example association calculation for a memory replacement arrangement.

FIG. 4 is a flow diagram illustrating an example association calculation process 400 for a memory replacement arrangement 300. In various implementations, the process 400 for the association calculation may be scheduled at a fixed (e.g., user-defined) time period, when certain conditions are satisfied, or the like. For example, the fixed time period may be flexible and configurable. The process 400 may be performed via the SQL analyzer 302, based on the received SQLs from the client 308.

At block 402, the process 400 includes obtaining the executed SQLs and their transaction Id by analyzing the database's logs. In an example, the output of block 402 can be shown in a table form as follows:

TABLE 1

| Sequence ID | Transaction Id | SQL |
| --- | --- | --- |
| 1 | 1001 | SELECT A, B FROM TABLE A |
| 2 | 1001 | SELECT A, B, C, SUM(D) FROM TABLE B |
| 3 | 1002 | SELECT A, C, F FROM TABLE C |
| ... | ... | ... |

At block 404, the process 400 includes analyzing the transactions and the involved SQLs to calculate the columns 106 requested by each transaction. In an example, the output of block 404 can be shown in another table form as follows:

TABLE 2

| Sequence ID | Transaction Id | Column |
| --- | --- | --- |
| 1 | 1 | COL A, COL B, COL C, COL D |
| 2 | 2 | COL B, COL C, COL D |
| 3 | 3 | COL B, COL C, COL G |
| 4 | 4 | COL C, COL G, COL H |
| ... | ... | ... |

At block 406, the process 400 includes using an associate rule algorithm to calculate the correlations between columns 102. In various implementations, one or more algorithms for generating association rules may be used to calculate the correlations. For example, some algorithms that may be used are APRIORI, ECLAT, and FP-GROWTH algorithms. In an implementation, the associate rule calculation engine 312 performs the correlation calculations.

Figure 5:
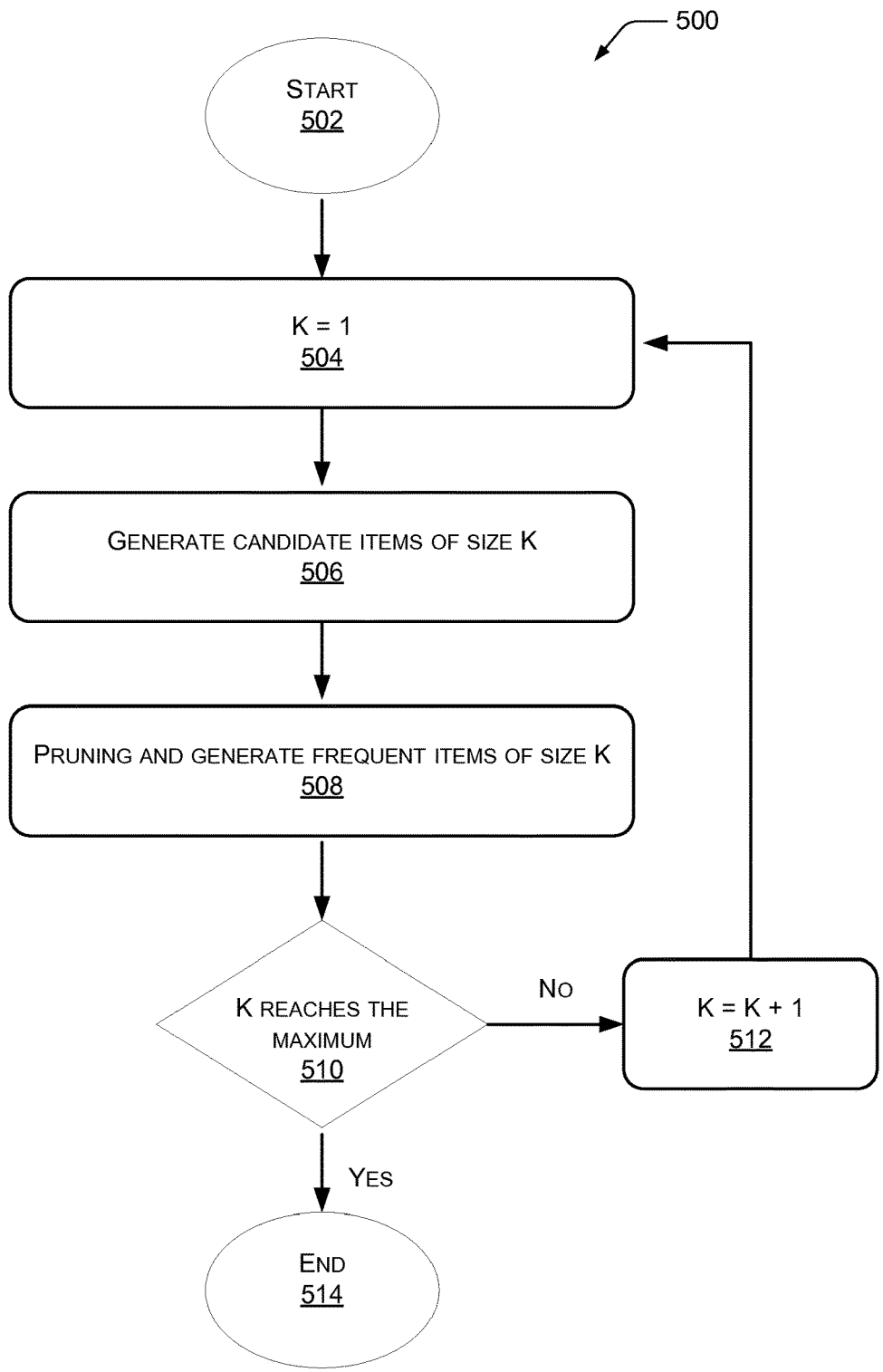
FIG. 5 is a flow diagram illustrating an example algorithm, which may be employed with a memory replacement arrangement.

For example, the APRIORI algorithm may be used to mine association rules, as shown in the flowchart of process 500 of FIG. 5. Process 500 may use a breadth-first search strategy to count the support of item sets and uses a candidate generation function which exploits the downward closure property of support. For instance, the APRIORI algorithm process 500 uses a breadth-first search and a Hash tree structure to count candidate item sets efficiently.

For example, at block 502, process 500 begins, and at block 504, process 500 includes initializing a variable k to 1. At block 506, the process includes generating candidate item sets of length k from item sets of length k−1. At block 508, the process includes pruning the candidates which have an infrequent sub pattern. According to the downward closure lemma, (blocks 510, 512) the candidate set contains all frequent k-length item sets. After that, the process includes scanning the transaction database to determine frequent item sets among the candidates. The process stops (at block 514) when k reaches the maximum.

In an example, the pseudo-code of the process for the APRIORI algorithm is as follows:

Apriori(T):
    $C_k$: Candidate item set of size k;
    $L_k$: frequent item set of size k;
    for (k = 1; $L_k$! = ∅; k++) do begin
        $C_{k+1}$ = candidates generated from $L_k$;
        for each transaction t in database do
            increment the count of all candidates in $C_{k+1}$ that are contained in t;
        $L_{k+1}$ = candidates in $C_{k+1}$ with min_support
    End;
    Return $L_k$;

Process 500 of the algorithm APRIORI may produce three double numbers as the outputs; including support, confidence, and lift. The support SUPP(X) of an item set X is defined as the proportion of transactions in the data set which contain the item set:

$$SUPP(X) = CNT(X)/CNT;$$

where CNT(X) is a function which reveals the transactions count which contain the item set X, and CNT is the total count of transactions.

The confidence of a rule is defined as:

$$CONF(X \Rightarrow Y) = SUPP(X \cup Y)/SUPP(X);$$

and the lift of a rule is defined as:

$$LIFT(X \Rightarrow Y) = SUPP(X \cup Y)/(SUPP(X)*SUPP(Y)).$$

In some implementations, a formula to calculate the final correlations can be defined as follows. To simplify calculations, a linear model can be used. The resulting formula is shown as:

$$C_i = \alpha * Confidence_i + \beta * (1 - Support_i) + \gamma * (1 - Lift_i),$$

where $Confidence_i$, $Support_i$, and $Lift_i$ can be calculated from the above-mentioned three formulas. Parameters: $\alpha$, $\beta$, and $\gamma$ are used to adjust the influence of the three factors of the formula.

To minimize the calculation scale and to improve the efficiency of the algorithm process 500, items which do not satisfy the minimum SUPPORT and minimum CONFIDENCE defined previously may be deleted. In some cases, this may lead to the result that only those columns 102, 106 with relatively high correlations are recorded in the result table. However, columns 102, 106 with lower correlations can also be useful. To ensure the columns 102, 106 with lower correlation are included, a minimum correlation value (e.g., MIN_CORRELATIONS) can be selected to include those columns 102, 106.

In one implementation, it can be determined that columns 102, 106 which have a correlation value (i.e., correlation degree) that equals the selected MIN_CORRELATIONS value are unrelated. Accordingly, the MIN_CORRELA-TIONS value can be selected and/or adjusted to adjust the solution set. In the implementation, the results (e.g., example correlation degrees between various columns 102, 106) can be shown in table form as follows:

TABLE 3

| ID | COLUMN A | COLUMN B | CORRELATION DEGREE |
|---|---|---|---|
| 1 | COL A | COL G | 0.01 |
| 2 | COL A | COL H | 0.01 |
| 3 | COL A | COL E | 0.1 |
| 4 | COL A | COL D | 0.1 |
| 5 | COL A, COL B | COL C | 0.4 |
| 6 | COL A, COL B | COL E | 0.5 |
| ... | ... | ... | ... |

MRA 300 may be arranged to use a memory block replacement algorithm to exchange columns 102 loaded in memory for requested columns 106, based on the correlation degrees determined above. In various implementations, the MRA 300 is arranged to use various other factors, parameter, constraints, etc., as discussed herein to exchange or replace the columns 102 for the columns 106.

Variables M_NEED_SIZE and M_FREE_SIZE may be determined as shown:

$$G\_SIZE = M\_NEED\_SIZE - M\_FREE\_SIZE.$$

In some implementations, the in-memory database has enough free memory 202 to load the necessary columns 106 if G_SIZE is less than zero. The memory replacement engine 304 may load all the relevant columns 106 into memory, via data loader engine 306. However, if G_SIZE is greater than zero, the memory replacement engine 304 proceeds to discard one or more of columns 102, not less than G_SIZE, based on one or more replacement algorithms.

SQL Analyzer 302 may be arranged to determine M_NEED_SIZE and the memory replacement engine 304 is arranged to determine M_FREE_SIZE.

Since the total size of the selected columns 106 must not be less than G_SIZE, the constraints function ensuring this relationship is shown as follows:

$$F(D_i) = \Sigma_{j=1}^{C(D_i)} \varnothing(j) - G\_SIZE \geq 0;$$

$$D_i \in \text{COMBINATION\_COLUMNS\_SET};$$

where $D_i$ is an item of COMBINATION_COLUMNS_SET, the set COMBINATION_COLUMNS_SET is the collection of CANDIDATE_COLUMNS. $C(D_i)$ represents the number of columns in the subset $D_i$, and $\varnothing(j)$ is a function which returns the size of column j.

The problem of how to select the columns 102 to discard from the set of candidate columns 102 may be formulated as an optimization problem. One or more of various algorithms can be used to solve this problem. For example, a Least Recently Used (LRU) algorithm can be used. The advantage of an LRU algorithm is that it can be reasonably simple and have a low computational cost. With the LRU algorithm, an objective function is not used. In an implementation, columns are selected with the earliest visit time, one by one, until a column 102 or columns 102 satisfy the constraints function. A relatively good result can be achieved with a relatively small computational cost. The pseudo-code for an LRU algorithm is shown as follows:

```
OptColumns(CANDIDATE_COLUMNS):
    CNT: The number of elements in CANDIDATE_COLUMNS;
    SIZE=0;
    For(k=1; k<=CNT; k++) do begin:
        SIZE= SIZE+Ø(j);
        If( SIZE>=G_SIZE ){
        Return Column 1:k;
        }
    }
End;
```

In another implementation, a better result can be achieved with a relatively low computational cost by using a random selection algorithm (RSA). Using the RSA, the maximum running time can be user-set and the maximum number of columns can be user-selected. The user-selections are optional, and can avoid a high number of iterations in the extreme cases. In an implementation, the RSA uses an objective function, which may be designed as follows:

$$\text{Score } (D_i) = \sum_{j=1}^{C(D_i)} \left( \frac{\alpha}{1+\tau(j)} * \frac{\beta}{\varphi(j)} * \frac{\gamma}{\phi(j)} \right);$$

$$D_i \in \text{COMBINATION\_COLUMNS\_SET}.$$

In the above formula, $D_i$ is a subset of CANDIDATE_COLUMNS; $C(D_i)$ is the number of columns in the subset $D_i$; $\tau(j)$ is an integer number indicating the recent visit time of the column j; $\varphi(j)$ is the visits of column j; $\varnothing(j)$ is the correlations between column j and the requested columns 106. The three arguments: $\alpha$, $\beta$, $\gamma$ are used to adjust the influence of the three factors of the formula. Their values range between zero and one.

In an implementation, the columns 102 with earlier visit time, lower visits and lower correlations will have a higher $D_i$ and will have higher priority to be discarded from memory 104. The objective function is a linear function and has a high fitness quality.

Finally, in an implementation, the target of the MRA 300 is to select a set of columns 102 with the maximum score, according to the following formula:

SELECTED_COLUMNS=
{argmax Score($D_i$)|$D_i \in$ COMBINATION_COLUMNS_SET }

The pseudo-code for the formula can be written as follows:

```
OptColumns(CANDIDATE_COLUMNS):
    N: The maximum number of columns could be selected;
    D_N: All item sets which generated from CANDIDATE_COLUMNS
    and have a size less than N;
    CNT: The number of elements in D_N;
    TIMEOUT=C;
    MaxScore=-1;
    MaxIndex=-1;
    TmpScore=0;
    K=1;
    while(K<=CNT||RUNTIME( )<TIMEOUT) do begin:
        TmpScore =Score(D_k);
        If(MaxScore<TmpScore){
            MaxScore= TmpScore;
            MaxIndex=k;
        }
        K++;
    }
Return D_MaxIndex;
End;
```

The function RUNTIME( ) may be defined as a return of the algorithm's current running time.

To get the best result without regard to the computational cost, the MRA 300 can calculate the $D_i$ of all subsets of the candidate columns which satisfy the constraints function $F(D_i)$, and then the columns 102 with a maximum $D_i$ value will be discarded from memory. The pseudo-code can be shown as follows:

```
OptColumns(CANDIDATE_COLUMNS):
    D: All item sets which generated from CANDIDATE_COLUMNS
    CNT: The number of elements in D;
    MaxScore=-1;
    MaxIndex=-1;
    TmpScore=0;
    K=1;
    while(K<=CNT) do begin:
      TmpScore =Score(D_k);
      If(MaxScore<TmpScore){
           MaxScore= TmpScore;
           MaxIndex=K;
      }
      K++;
    }
    Return D_MaxIndex;
    End;
```

The function RUNTIME( ) may be defined as a return of the algorithm's current running time.

Figure 6:
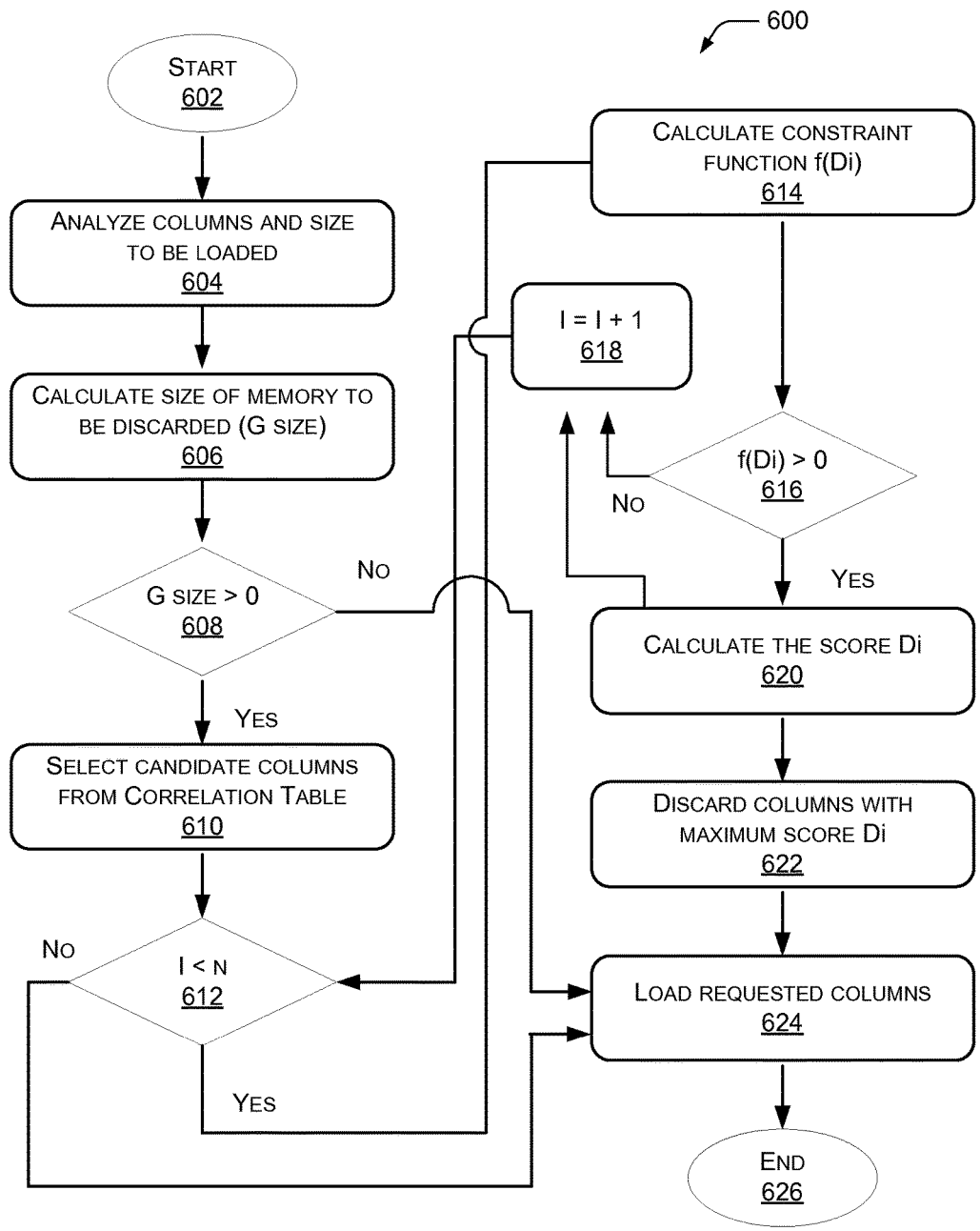
FIG. 6 is a flow diagram illustrating an example process for replacing or exchanging data in memory.

FIG. 6 is a flow diagram illustrating an example process 600 for replacing or exchanging data 102 in memory 104 for requested data 106. For example, the process 600 replaces data blocks 102 in memory 104 for data blocks 106, as data blocks 106 are requested by an in-memory database, using one or more memory replacement algorithms. The process 600 is described with reference to FIGS. 1-5.

The order in which the processes 400, 500, and 600 are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, the processes can be implemented with any suitable components, or combinations thereof, without departing from the scope of the subject matter described herein.

At block 602, the process begins, and at block 604, the process includes analyzing requested columns (e.g., data blocks, such as data blocks 106, for example) to be loaded, including the size of the data blocks. In an implementation, the process includes analyzing database logs to determine executed structured query language (SQL) requests and the associated requested data blocks to determine an amount of memory to be used to load the requested data blocks into the memory.

At block 606, the process includes calculating an amount of loaded data to be discarded from the memory to make room for the requested data blocks (e.g., columns). For example, the process includes calculating the amount of loaded data to be discarded from the memory when the quantity of free memory is less than a size of the requested data blocks.

At block 608, the process includes checking to see if the amount of space needed is greater than zero. For example, if the amount of space needed is less than zero, no data blocks will be discarded from the memory to load the requested data blocks.

At block 610, the process includes selecting candidate loaded data blocks to be discarded from the memory, based on correlations of the loaded data blocks to the requested data blocks. In an implementation, the process includes determining correlations between one or more loaded data blocks and the requested data blocks using an association rule algorithm. In another implementation, the process includes scheduling execution of the association rule algorithm periodically, or at user-defined time periods when system workload is low. In one implementation, the outputs of the association rule algorithm include the values: support, confidence, and lift.

At block 612, the process includes checking to see if any of the loaded data blocks have a minimum correlation to the requested data blocks. If they do, then the process proceeds to block 614, which includes calculating a constraint function. In an implementation, the process includes constraining a total quantity of candidate loaded data blocks to be discarded from the memory. For example, the constraint function ensures that a minimum number of loaded data blocks are discarded from the memory to make room for the requested data blocks, without discarding an unnecessarily excessive number of loaded data blocks. This constraint function is checked at block 616. At block 618, the process includes incrementing the iterative process of checking the minimum correlation of the data blocks.

In an implementation, the process includes selecting a minimum threshold correlation value to determine a desired set of candidate loaded data blocks. At block 620, the process includes calculating a score for each candidate loaded data block. In an implementation, the process includes selecting the quantity of candidate loaded data blocks to be discarded from the memory in a descending order by highest score.

At block 622, the process includes discarding a quantity of candidate loaded data blocks with a greatest score. In an implementation, the process includes selecting candidate loaded data blocks to be discarded from the memory based on at least one of: a size of the requested data blocks to be loaded, a size of free memory, recent loaded data block access, or recent loaded data block access times. For example, the process includes predicting which of the loaded data blocks will not be accessed in the nearest future.

At block 624, the process includes loading the requested data blocks into the memory. At block 626, the process ends with the requested data blocks loaded into memory in preparation for execution or other use. In alternate implementations, other techniques may be included in the process 600 in various combinations, and remain within the scope of the disclosure.

Portions of the subject matter of this disclosure can be implemented as a system, method, apparatus, or article of manufacture using standard programming and/or engineering techniques to produce software, firmware, hardware or any combination thereof to control a computer or processor (such as processor 110, for example) to implement the disclosure. For example, portions of an example system 100 may be implemented using any form of computer-readable media (shown as memory 104 in FIG. 1, for example) that is accessible by the processor 110. Computer-readable media may include, for example, computer storage media and communications media.

Computer-readable storage media includes volatile and nonvolatile, removable and non-removable media implemented in any method or technology for storage of information such as computer-readable instructions, data structures, program modules or other data. Memory 104 is an example of computer-readable storage media. Storage 108, which may comprise local, network, or cloud storage, for example, is another example of computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic disks or other magnetic storage devices, or any other medium which may be used to store the desired information and which may be accessed by the processor 110.

In contrast, communication media typically embodies computer readable instructions, data structures, program modules, or other data in a modulated data signal, such as a carrier wave, or other transport mechanism.

While the subject matter has been described above in the general context of computer-executable instructions of a computer program that runs on a computer and/or computers, those skilled in the art will recognize that the subject matter also may be implemented in combination with other program modules. Generally, program modules include routines, programs, components, data structures, and the like, which perform particular tasks and/or implement particular abstract data types.

Moreover, those skilled in the art will appreciate that the innovative techniques can be practiced with other computer system configurations, including single-processor or multi-processor computer systems, mini-computing devices, mainframe computers, as well as personal computers, hand-held computing devices, microprocessor-based or programmable consumer or industrial electronics, and the like. The illustrated aspects may also be practiced in distributed computing environments where tasks are performed by remote processing devices that are linked through a communications network. However, some, if not all aspects of the disclosure can be practiced on stand-alone computers. In a distributed computing environment, program modules may be located in both local and remote memory storage devices.

Although implementations have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations. For example, the methodological acts need not be performed in the order or combinations described herein, and may be performed in any combination of one or more acts.

What is claimed is:

1. Non-transitory computer-readable storage media, having computer-executable instructions stored thereon, that when executed, cause a computer processor to initiate a process, comprising:
    prior to receiving a data query in a query language to the database system, determining correlations between data blocks in a table of a relational database system based on confidence, support, and lift values calculated by an association rule algorithm using logged data from prior data queries in the query language, the logged data comprising, for each of a plurality of data queries, a plurality of columns accessed in a respective query, wherein a data block corresponds to a column of data in the relational database system;
    receiving the data query, the data query comprising a request for one or more data blocks of the table;
    determining an amount of a memory to be used to load the requested data blocks into the memory;
    calculating, in response to a quantity of free memory being less than a size of the requested data blocks, an amount of loaded data blocks to be discarded from the memory, based on a quantity of the requested data blocks;
    selecting, based on the pre-determined correlations based on confidence, support, and lift values, candidate loaded data blocks of the one or more loaded data blocks to be discarded from the memory;
    calculating a score for each candidate loaded data block, based on an objective function, recent visit time, and at least one of the correlations based on confidence, support, and lift values;
    selecting a quantity of the candidate loaded data blocks with a greatest score using a random selection algorithm with a pre-set runtime specified with respect to a timeout value, wherein the random selection algorithm is not further executed when a running time of the random selection algorithm exceeds the timeout value;
    discarding the quantity of the candidate loaded data blocks;
    loading the requested data blocks into the memory;
    executing the data query using the requested data blocks; and
    returning query execution results.

2. The non-transitory computer readable storage media of claim 1, further comprising constraining a total quantity of the candidate loaded data blocks to be discarded from the memory based on a constraint function.

3. The non-transitory computer readable storage media of claim 1, wherein determining correlations between the one or more loaded data blocks and the requested data blocks comprises predicting which of the loaded data blocks will not be accessed in the nearest future.

4. The non-transitory computer readable storage media of claim 1, wherein the candidate loaded data blocks have a lower correlation to the requested data blocks than other loaded data blocks.

5. The non-transitory computer readable storage media of claim 1, wherein the data blocks comprise columns of data of a column-based in-memory database application.

6. A system, comprising:
    a processor;
    a data storage hardware apparatus communicatively coupled to the processor and arranged to store requested data columns for an in-memory relational database application;
    a memory hardware device communicatively coupled to the processor and arranged to store loaded data columns for the in-memory database application; and
    computer-executable instructions stored in the memory hardware device and operative on the processor to:
        receive a database query in a query language;
        determine one or more data columns of a table of the relational database application requested by the database query;
        determine at least one of the one or more data columns that is not loaded into the memory hardware device;
        determine that an amount of available memory is not sufficient for loading of the at least one data column;
        calculate an amount of loaded data to be discarded from the memory;
        select candidate loaded data columns to be discarded from the memory, based on, for the table pre-computed correlations of the loaded data columns to the requested data columns calculated before the database query was received, wherein the correlations are based on confidence, support and lift values calculated by an association rule algorithm based on logged data of prior database queries in the query language, the logged data comprising, for each of a plurality of queries, a plurality of data columns accessed in a respective query, calculate a score for each candidate loaded data column;

select a quantity of the candidate loaded data blocks with a greatest score;

discard the quantity of the candidate loaded data columns; and load the requested data columns into the memory.

7. The system of claim 6, wherein the computer-executable instructions are operative on the processor to select the candidate loaded data columns to be discarded from the memory based on at least one of: a prediction of which of the loaded data columns will not be accessed in the nearest future, a correlation value between one or more loaded data columns and the requested data columns, a constraint function, the score for each candidate loaded data column, a size of the requested data columns to be loaded, a size of free memory, recent loaded data column access, or recent loaded data column access times.

8. The system of claim 6, wherein selecting a quantity of the candidate loaded data blocks with a greatest score uses a pre-set runtime specified with respect to a timeout value, wherein a selection algorithm is not further executed when a running time of the selection algorithm exceeds the timeout value.

9. A method of replacing loaded data blocks with requested data blocks in a memory, comprising:

receiving a database query in a query language;

determining one or more columns of a table in a relational database system accessed by the database query;

determining at least one of the one or more columns that is not loaded into memory;

determining that an amount of available memory is not sufficient for loading of the at least one column;

calculating an amount of loaded data to be discarded from the memory;

determining correlations between the loaded data blocks and the requested data blocks based on confidence, support and lift values calculated by an association rule algorithm using history data determined from a plurality of prior database queries in the query language, the history data comprising columns of one or more tables in the relational database system accessed by a respective query;

selecting, based on the correlations of the loaded data blocks to the requested data blocks, candidate loaded data blocks to be discarded from the memory;

calculating a score for each candidate loaded data block;

selecting a quantity of the candidate loaded data blocks with a greatest score;

discarding the quantity of the candidate loaded data blocks;

loading the requested data blocks into the memory; and adding the query to the history data.

10. The method of claim 9, further comprising analyzing database logs to determine executed structured query language (SQL) requests and the associated requested data blocks.

11. The method of claim 10, further comprising determining an amount of the memory to be used to load the requested data blocks into the memory.

12. The method of claim 9, further comprising calculating, in response to the quantity of free memory being less than a size of the requested data blocks, the amount of loaded data to be discarded from the memory.

13. The method of claim 9, further comprising scheduling, in response to system workload being low, execution of the association rule algorithm periodically, or at user-defined time periods.

14. The method of claim 9, wherein the association rule algorithm comprises an APRIORI algorithm.

15. The method of claim 9, further comprising selecting the candidate loaded data blocks to be discarded from the memory based on at least one of: a size of the requested data blocks to be loaded, a size of free memory, recent loaded data block access, or recent loaded data block access times.

16. The method of claim 9, further comprising predicting which of the loaded data blocks will not be accessed in the nearest future.

17. The method of claim 9, further comprising selecting a minimum threshold correlation value to determine a desired set of the candidate loaded data blocks.

18. The method of claim 9, further comprising selecting the quantity of the candidate loaded data blocks to be discarded from the memory in a descending order by highest score.

19. The method of claim 9, further comprising constraining a total quantity of the candidate loaded data blocks to be discarded from the memory.

20. The method of claim 9, wherein selecting a quantity of the candidate loaded data blocks with a greatest score uses a pre-set runtime specified with respect to a timeout value, wherein a selection algorithm is not further executed when a running time of the selection algorithm exceeds the timeout value.

* * * * *